Figure 1:
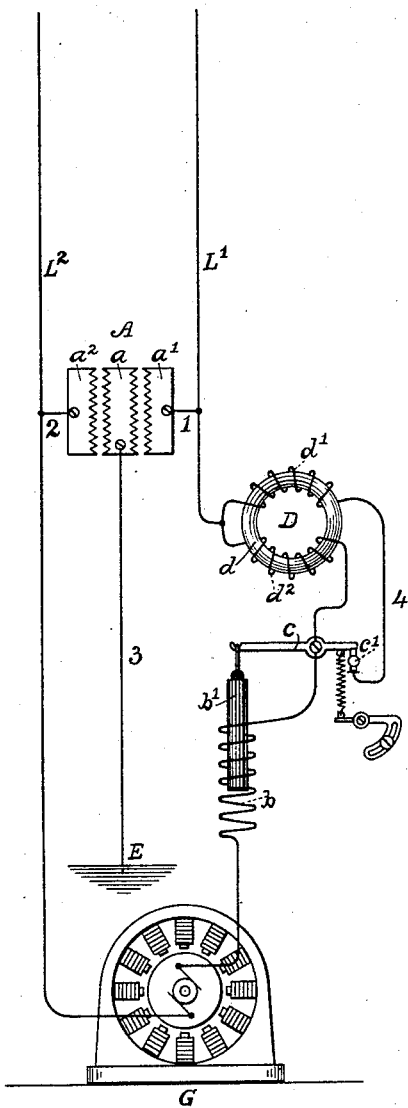

(No Model.) 2 Sheets—Sheet 1.

L. B. STILLWELL.
PROTECTOR FOR ELECTRIC MACHINES.

No. 434,163. Patented Aug. 12, 1890.

Witnesses
George Brown, Jr.
James Wm. Smith

Inventor
Lewis B. Stillwell
By his Attorney
Charles A. Terry (No Model.) 2 Sheets—Sheet 2.
L. B. STILLWELL.
PROTECTOR FOR ELECTRIC MACHINES.

No. 434,163. Patented Aug. 12, 1890.

Witnesses
George Brown Jr.
James Wm. Smith.

Inventor
Lewis B. Stillwell.
By his Attorney
Charles A. Terry.

THE NORRIS PETERS CO., PHOTO-LITHO., WASHINGTON, D. C.

UNITED STATES PATENT OFFICE.

LEWIS B. STILLWELL, OF PITTSBURG, PENNSYLVANIA, ASSIGNOR TO THE WESTINGHOUSE ELECTRIC COMPANY, OF SAME PLACE.

PROTECTOR FOR ELECTRIC MACHINES.

SPECIFICATION forming part of Letters Patent No. 434,163, dated August 12, 1890.

Application filed September 2, 1889. Serial No. 322,703. (No model.)

*To all whom it may concern:*

Be it known that I, LEWIS B. STILLWELL, a citizen of the United States, residing in Pittsburg, in the county of Allegheny and State of Pennsylvania, have invented a certain new and useful Improvement in Protectors for Electric Machines, (Case No. 309,) of which the following is a specification.

The invention relates to the class of devices employed for protecting electric circuits from injury by reason of lightning-discharges and currents of abnormal strength.

In practice it is found that the more serious injuries which result to electric circuits conveying currents supplied from dynamo-electric generators are often occasioned not so much by the lightning itself as by the current flowing from the dynamo after an earth-circuit or short circuit has been established by the lightning-discharge. It becomes important therefore to first afford the lightning-discharge a passage to the earth and to then prevent the generated current from the dynamo from flowing through the path traversed by the lightning-discharge. Various different methods have heretofore been proposed for accomplishing this result, as, for instance, by interposing in the earth-circuit a safety-fuse, which, while affording a passage to the lightning-discharge, is melted by the continuous flow of the current from the generator, thus interrupting the circuit-connections.

The object of my invention is to introduce by the action of a lightning-discharge or the current immediately succeeding it an inductive resistance which will be sufficient to obstruct the flow of the current from the dynamo through the lightning-arrester and cause it to cease before it can do injury to the apparatus. This may be accomplished in various different ways. In some instances it is preferred to introduce a double-wound reactive coil, the two coils opposing each other and normally so introduced into the circuit that the current will flow in the coils in the opposite directions, whereby the inductive effects of one coil neutralize that of the other, so that the current may flow without encountering material opposition. Means are included in the circuit whereby an abnormal current of short duration—such as a lightning-discharge—will be allowed to pass to the earth through some form of lightning-discharge device, while the current generated by the dynamo following in the path of the discharge cuts one of the coils out of the circuit, leaving the other one in circuit alone, thereby opposing to the flow of the currents an inductive resistance or counter electro-motive force of sufficient value to interrupt or greatly decrease the flow of the current through the lightning-arrester.

Figure 2:
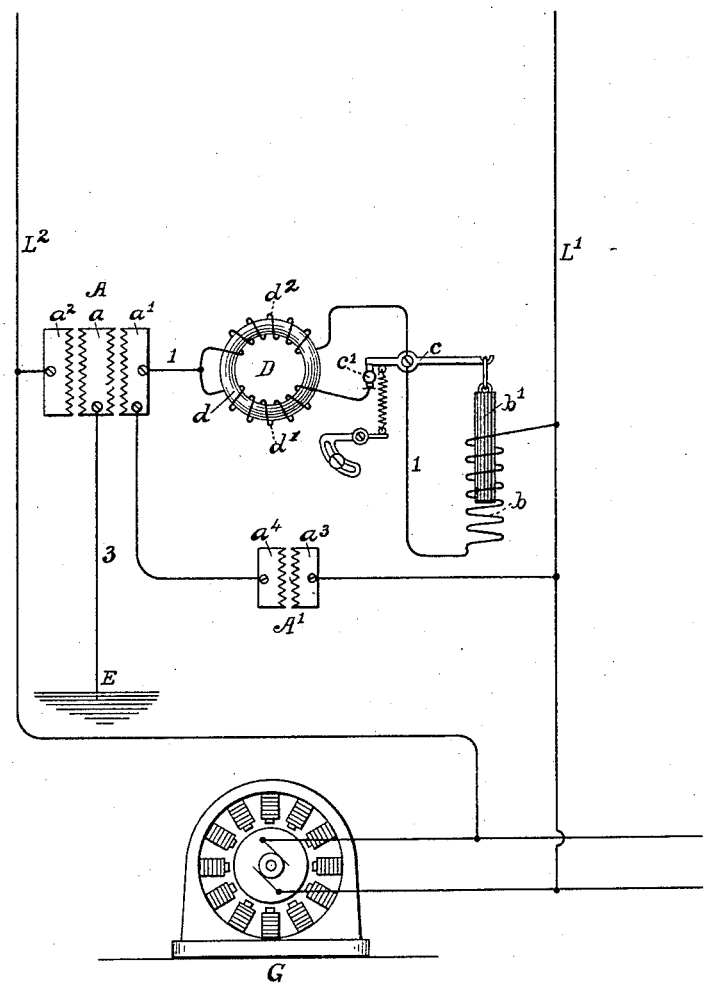

The application of the invention will be described in connection with the accompanying drawings, in which Figure 1 is a diagram illustrating one organization of circuits and apparatus, and Fig. 2 is a second organization for carrying the invention into practice.

Referring to Fig. 1, $L'$ $L^2$ represent main-line conductors or circuits connected with any suitable source G of alternating, intermittent, or pulsatory electric currents. Conductors 1 and 2 lead from the lines $L'$ $L^2$ to the two discharge-plates $a'$ $a^2$ of a lightning-arrester A of any suitable well-known construction. The center plate $a$ of this arrester is electrically connected with the earth at E by the conductor 3. The plates $a'$ $a^2$ are supposed, in this instance, to be constructed with teeth or discharge-points projecting toward similar points upon the plate $a$. The plates are separated from each other the requisite distance, depending upon the requirements of any given case. There is included in the conductor $L'$ between the source and conductor 1 a solenoid $b$, consisting of a few turns of conducting-wire and provided with a core $b'$, adapted to be drawn into the solenoid under the influence of an abnormal current traversing the coil $b$. The core is suspended from, applied to, or connected with a switch or circuit-controlling device $c$. This is connected with the main line $L'$ through two different paths, one of which is always complete and the other of which is interrupted when the core $b'$ is drawn farther into the solenoid $b$.

The circuit-connections are as follows: One circuit is completed through a coil $d^2$ of a reactive device D, and the other through the lever $c$ and its resting contact-point $c'$, the conductor 4, and a second coil $d'$ of the reactive device D. The two coils $d'$ and $d^2$ are so wound and connected with the main line L' that the currents flowing through the two coils and acting upon a common core $d$ neutralize the effects of each other, and therefore practically no resistance is normally offered to the flow of the currents through the device D. If, however, the circuit through the coil $d'$ should be interrupted, then all the reactive effects or counter electro-motive force of the coil $d^2$ will be interposed in the line L', and thus tend to prevent the flow of the current through the conductor.

The operation of the apparatus is as follows: If the lightning should strike the lines L' and L² and escape through the plates $a'$, $a^2$, and $a$ and the conductor 3 to the earth at E, establishing an arc across the plates, then there would be a tendency for the current from the generator G to continue to flow through the arrester A, and this current would be of abnormal strength, owing to the short circuit thus formed. The abnormal current traversing the coil $b$ would act upon the core $b'$, and, by moving the switch or lever $c$, or equivalent circuit-breaking device, interrupt the connections at the point $c'$, thus cutting the coil $d'$ out of the circuit. The total reactive effect of the coil $d^2$ would then be introduced into the circuit, thus interposing an opposing force of such value as to cut down the current from the generator sufficiently to greatly diminish or even interrupt the arc at the plates $a'$ $a$. The switch $c$ would then be allowed to return to its contact-point $c'$, thus again closing the circuit-connections, and the apparatus would then again be in its normal condition. It is evident that this operation might take place at frequent intervals during a thunder-storm without injury to the apparatus, and thus dispense with the necessity of replacing fuses or other suitable devices, an operation which is accompanied with considerable danger during the continuance of a storm. The two conductors L' L² are usually in such proximity that both are subjected to the same lightning-discharge. The lightning upon the side L² escapes to the earth through the plates $a^2 a$; but the inductive apparatus will prevent the short-circuiting of the dynamo.

Another method of connecting the apparatus in the circuit is shown in Fig. 2, in which the solenoid $b$ and its core $b'$, together with the switch device $c$ and contact-point $c'$ and reactive coil D, are introduced in the conductor 1 between the line L' and plate $a'$. The effect and operation of this organization are similar to that already described, with the exception that the normal current flowing through the line L' does not traverse the coil $b$ nor the reactive device D, but only as the current is flowing through the lightning-arrester A to the earth are these coils brought into operation. It will be seen that the lightning-discharge traversing the conductor 1 will meet with little or no resistance as long as the circuit is closed at $c$. The lightning-discharge, which is almost instantaneous, will take place before the core $b'$ has responded to the pull of the solenoid $b$; but the succeeding current from the generator will immediately operate this device and introduce the reactive effects of the coil $d^2$, thus interrupting the flow of the current through the lightning-arrester.

In some instances the tendency of the current to escape without traversing the coils of the reactive or induction devices might occasion a short circuit around a portion of the same. To prevent any injury from such a cause a discharge device A' may be provided. This consists of two plates $a^3$ $a^4$, respectively connected with the line L' and the plate $a'$. Should the lightning-discharge fail to follow the circuit through $b$, $d'$, and $d^2$, it can pass to earth through the plates $a^3$ $a^4$ $a'$ $a$ and the wire 3. When the lightning-discharge has passed, a portion or all of the current will flow through the reactive devices and interrupt the flow of current at the plates $a^3$ and $a^4$, and operate as before described. A similar device may be used in like manner in connection with the apparatus shown in Fig. 1.

The discharge-plate $a^2$ (shown as connected with the line L²) may also be provided with an arresting device similar to that described in the organization above referred to; but usually this will not be necessary.

It will be understood from the foregoing description that the circuit-connections are not interrupted by the operation of the circuit-controlling apparatus; but the connections are so changed as to introduce temporarily an effective opposition to the flow of the current through the path established by the lightning-discharge, and immediately upon the interruption of such flow of currents the opposition is withdrawn from the circuit.

I claim as my invention—

1. The combination, with a lightning-arrester, of a differentially-wound reactive coil, through both coils of which the initial current may flow, and means for interrupting the connections through one of said coils by an abnormal flow of current therethrough.

2. In an apparatus for protecting electric circuits, the combination of two opposing coils, a core to which they are applied, and means for interrupting the circuit-connections through one of said coils upon an abnormal flow of current through both.

3. The combination of a set of discharge-points, one connected with the earth and the other with the main line of a system of distribution, differentially-wound reactive coils, and a circuit-interrupter connected with one of said coils brought into action by an abnormal flow of current through both coils, as and for the purpose described.

4. The combination, with a main line of a system of distribution, of an earth-circuit for lightning-discharges, a differentially-wound reactive coil through both of which the initial currents may pass to the earth, and a circuit-interrupting device for severing the connections with one of the coils of said reactive coil upon the passage of an abnormal current.

5. In a system of electrical distribution, a discharge device for lightning, consisting of an earth-circuit of sufficient resistance to prevent the passage of currents of normal strength, a reactive device having opposing coils connected in the main-line circuit, and a device responding to a continuous flow of currents of abnormal strength through both coils to interrupt the flow of current through one of the coils, substantially as described.

6. The combination, with a system of electrical distribution, of apparatus for protecting the same against the effects of lightning, which consists of the discharge-plates of a lightning-arrester, one of which is connected with the earth and one with a main-line conductor, and two coils applied to a single core and normally differentially connected in the same circuit, and an electro-magnet responding to currents of abnormal strength having its coils connected in series with both the coils and serving to interrupt the connections of one of said coils, substantially as described.

7. The combination, with a lightning-arrester, of a differentially-wound reactive coil, through both coils of which the initial current may flow, and means for interrupting the connections through one of said coils by an abnormal flow of current therethrough, and a discharge device connected around said differentially-wound coil.

In testimony whereof I have hereunto subscribed my name this 29th day of August, A. D. 1889.

LEWIS B. STILLWELL.

Witnesses:
   W. D. UPTEGRAFF,
   CHARLES A. TERRY.